UNITED STATES PATENT OFFICE.

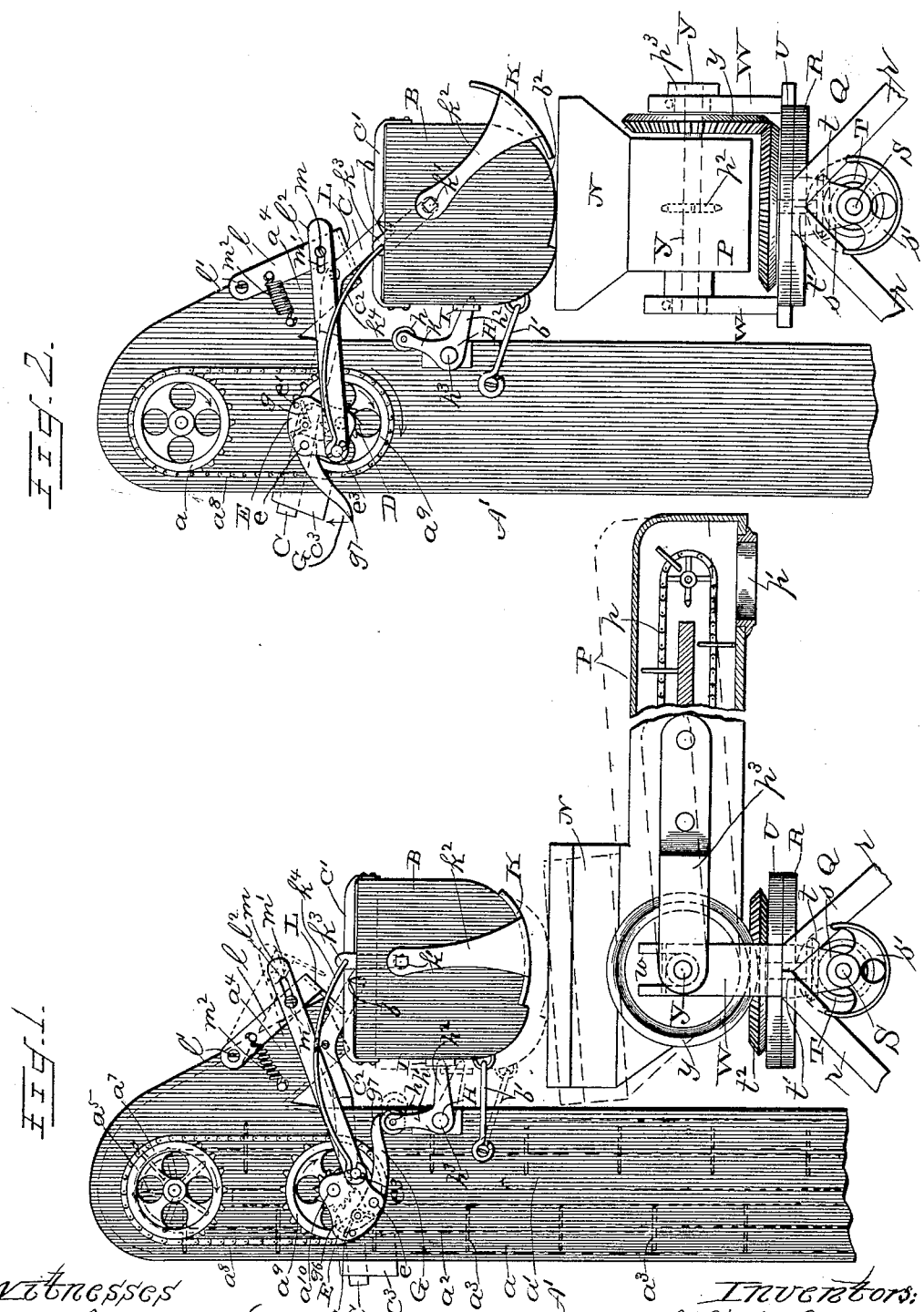

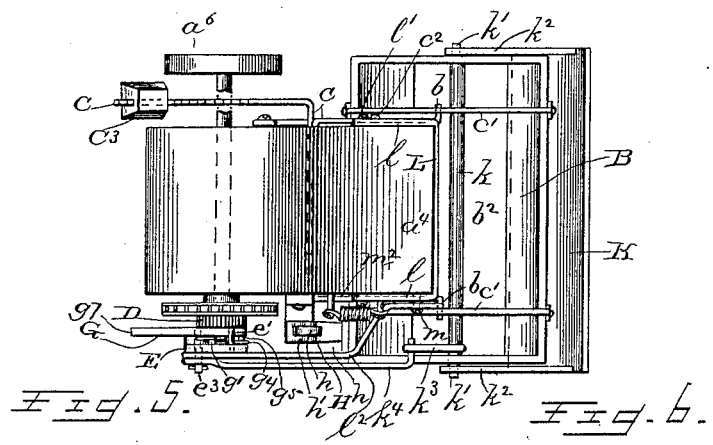
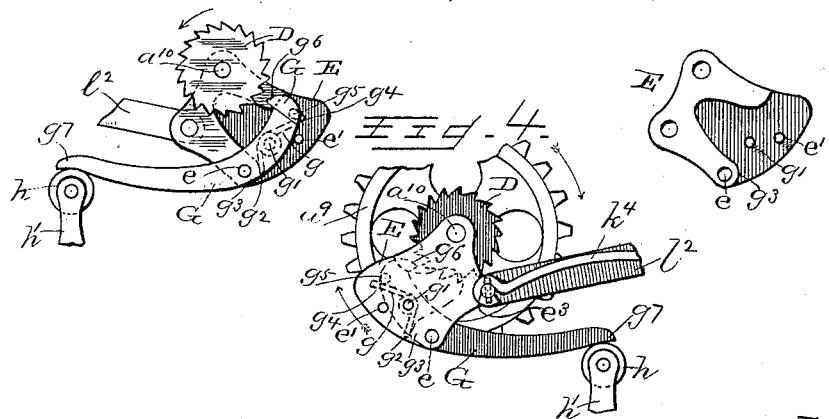
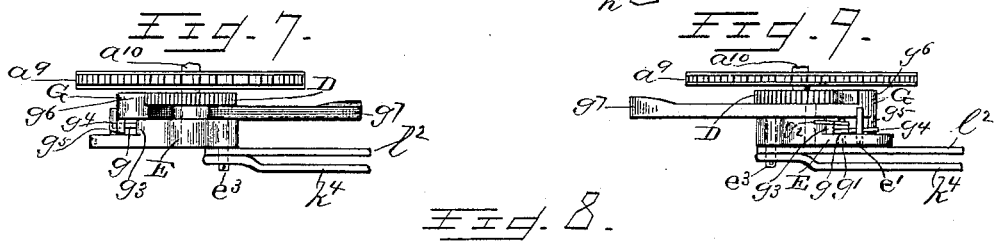
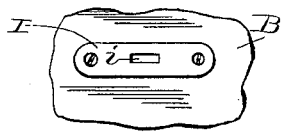

VALENTIN WEBER, OF PRINCEVILLE, AND JAMES R. HARRISON, OF PEORIA, ASSIGNORS OF ONE-THIRD TO WILLIAM HARRISON, OF PEORIA, ILLINOIS.

GRAIN WEIGHER AND CONVEYER SPOUT.

SPECIFICATION forming part of Letters Patent No. 520,382, dated May 22, 1894.

Application filed January 6, 1893. Serial No. 457,492. (No model.)

*To all whom it may concern:*

Be it known that we, VALENTIN WEBER, residing at Princeville, and JAMES R. HARRISON, residing at Peoria, in the county of Peoria and State of Illinois, citizens of the United States, have invented certain new and useful Improvements in Grain Weighers and Conveyer Spouts, of which the following is a specification.

Our present invention relates to improvements in that type of automatic grain weighers in which the grain receiver or hopper is suspended on a poised graduated scale-beam, between the grain discharging spout of a continuously operating grain elevating mechanism, and a conveyer spout which receives the charges of grain from the receiver or hopper and delivers the grain to a wagon or other receptacle, and in which the rising and falling movements of the receiver or hopper actuate the mechanism for tripping into action the devices for opening and closing the cut off valve of the elevator discharging spout, and the valve which opens and closes the discharge opening of the hopper.

Our invention has for its main object the production of an efficient automatic grain weigher of the class hereinbefore recited, and with an improved and extremely sensitive trip mechanism and improved means for transmitting motion from the intermittently revolved tripping pawl carrier plate to the valves of the hopper discharge and elevator discharge or hopper feeding spout; whereby the operations of the trip mechanism will be rendered certain, and the operations of said valves positive, the grain weighing more accurate, efficient and certain, and the device structurally strong and durable, and economic of manufacture; and as a further object the production of an efficient, adjustable conveyer spout adapted to receive the charges of grain from a hopper and deliver it in different directions and at different elevations.

With these ends in view our invention consists in certain novel features of construction, arrangement, and combinations of parts as will be hereinafter fully described and pointed out in the claims hereto appended.

Mechanism embodying the constructive forms of, and showing the mutual relationship and combination of the parts forming the subject matter of our improvements is illustrated in the accompanying drawings, in which—

Figure 1 is a side elevation of the upper part of an elevator trunk, a delivering spout, and intermediary weighing mechanism embodying our improvements; Fig. 2, an elevation of the same parts as Fig. 1, but shown in different relative positions from what shown at Fig. 1; Fig. 3, a top plan of the elevator and weighing mechanism or device with the operating parts in same relative positions as shown at Fig. 2; Fig. 4, a detail, an enlarged side elevation of the trip mechanism, partly broken away, with the operating parts in same relative positions as shown at Fig. 1; Fig. 5, a detail, an enlarged side elevation of part of the trip mechanism shown at Fig. 4, but seen from its opposite side to that shown at Fig. 4; Fig. 6, a detail, an enlarged rear side elevation of the intermittingly rotated crank arm, and trip carrying plate; Fig. 7, an enlarged top plan of the parts shown at Fig. 4 in same relative positions as shown at said figure; Fig. 8, an enlarged elevation of part of the hopper, and the plate with which the elbow-shaped detent lever engages; Fig. 9, an enlarged top plan of the parts shown at Figs. 4 and 7 but in same relative positions as shown at Fig. 2.

The construction and relative arrangement of the parts of our improvement, and the adjacent parts of a general machine in which said improvements may be incorporated, are as follows:

The upper part of an elevator A is shown in the drawings, of that type or class in which the trunk A' is divided into two tubes $a$, $a'$ in one of which $a$, the elevator chain $a^2$ ascends, and in the other $a'$ of which it descends, and in which the flights $a^3$ discharge their contents through a discharge spout $a^4$, as they pass off the sprocket wheel $a^5$ over which they are carried by the chain $a^2$. The elevator chain, flights, and sprocket wheel referred to above are shown by dotted lines. The shaft of the sprocket wheel $a^5$ extends through the elevator casing and carries a belt pulley $a^6$ on one end (see Fig. 3), and a sprocket wheel $a^7$ on its other end. The sprocket wheel $a^7$ is geared by a sprocket chain $a^8$ with another sprocket wheel $a^9$ in such manner that the sprocket wheel $a^9$ runs continuously with the elevating mechanism, and which elevating mechanism while in operation discharges a continuous flow of grain or other material into the discharge spout $a^4$. The drive pulley $a^6$ gears with and is driven by any suitable part of a grain separator or other device for delivering grain to the elevator.

The elevator shown, and hereinbefore described is an ordinary construction, but in so far as our invention is concerned any construction of elevator may be used having a discharge spout below which a hopper can be suspended and in which a wheel can be operated by the elevating mechanism, for operating the trip mechanism by means of which the valves of the discharge spout and of the hopper are swung to open and close the discharge openings of said parts as hereinafter described. The hopper B is also of an ordinary construction and is poised at $b$ on the two arms $c'$ of a graduated scale beam C, which is itself in turn, poised at $c^2$ on the elevator, and is provided with a sliding weight $c^3$ which can be adjusted on the scale beam to counterbalance the hopper when charged with the quantity of different kinds of grain or other articles which it is desired that each charge of the hopper should contain. This method of suspending the hopper below the discharge opening of the elevator, on a poised and graduated scale beam in such manner that it can have a limited rising and falling movement, while at the same time held in an upright position and guided in an approximately vertical path, by link rods $b'$, and by its hinged connection with the scale-beam, is also common and well known.

The pinion $a^9$ is fixed on a shaft $a^{10}$ the outer end of which projects beyond the pinion $a^9$ and has fixed thereto a ratchet wheel D which rotates continuously with the sprocket wheel $a^9$. The intermittingly revolving plate E is mounted loosely on the outer end of the shaft $a^{10}$ exterior to the ratchet wheel D, and a tripping pawl G is pivoted at $e$ to the side of the plate E confronting the ratchet wheel D. A spring $g$ coiled at its midlength part on a stud $g'$ which projects from the plate E, rests with one end $g^2$ upon a projection $g^3$ from said plate, and with its other end $g^4$ upon a stud $g^5$ which projects from the tripping pawl G in such manner that the spring tends to force the end $g^6$ of the tripping pawl into engagement with the ratchet wheel D, while permitting its disengagement therefrom, as hereinafter described. While the end $g^6$ of the tripping pawl is engaged with the ratchet wheel D the tripping pawl and the plate E will be continuously revolved with the rotations of the pinion $a^9$ and ratchet wheel D, until the extended end $g^7$ of the tripping pawl comes, as hereinafter described, in contact with the antifriction roller $h$ in the vertical end $h'$ of a bell crank detent lever H, the other end $h^2$ of which detent lever extends into a slot $i$ in the plate I which is fixed to the side of the hopper B. The detent lever H is pivoted at $h^3$, at its bend, to the side of the elevator trunk A, and in such position with reference to the tripping pawl G and hopper B that when the hopper is in its elevated or higher position, as shown by full lines at Fig. 1, the detent lever H will be in the position shown best at Fig. 1, by full lines, and in such position that the roller $h$ will be in the path of the end $g^7$ of the tripping pawl as it revolves, and hence said end $g^7$ of the tripping pawl will come in contact with the roller $h$ when the hopper is in its elevated position, and the pawl end $g^6$ be thereby forced out of contact with the ratchet wheel D and against a stud pin $e'$ which projects from the plate E. While the pawl G is thus released from the ratchet wheel D, and held by the detent lever H and the pin $e'$, it will hold and prevent the plate E revolving with the ratchet wheel D and pinion $a^9$.

The hopper in dropping to its lower position, shown by dot lines at Fig. 1 will tilt or turn the detent lever H into the position shown by dot lines at same figure, and the end $g^7$ of the tripping pawl be thereby released from the detent, or detaining lever H, when the tripping pawl then being free will be thrown into contact with the ratchet wheel D, by the spring $g$, and the plate E and spring pawl then be revolved with the pinion $a^9$ as hereinbefore described.

A rock-shaft $k$ extends across and is journaled in the sides of the hopper B, and has fixed to each of its extended ends $k'$, the one end of an arm $k^2$, the other ends of which arms $k^2$ have fixed thereto, a delivery valve K, which swings with the arms $k^2$ in one direction to close, and in an opposite direction to open the orifice $b^2$ through which the charges of grain are discharged from the hopper and delivered to the conveyer. A crank arm $k^3$ as shown is fixed to and projects from the rock shaft $k$, which may be substituted if preferred by an extension of one of the arms $k^2$. A connecting rod $k^4$ is pivotally connected at one of its ends with the outer, or upper end of the crank-arm $k^3$, and at its other end with a crank pin $e^3$ on the plate E, so that the revolutions of the crank pin $e^3$ with the plate E will swing the arm $k^3$ outwardly and thereby swing the valve K inwardly or toward the elevator trunk, to close the orifice $b^2$ as shown at Fig. 1, and swing the arm $k^3$ in an opposite direction or toward the elevator trunk, and thereby swing the valve K outwardly, to the position shown at Fig. 2, to uncover or open the orifice $b^2$. The valve L, is fixed to the lower ends of the arms $l$, the upper ends of which are pivoted at $l'$ to the sides of the spout $a^4$, in such manner that this valve can be swung into the position shown at Fig. 2, to cover or close the open lower end of the spout $a^4$, and swung into the position shown by full lines at Fig. 1 to open or uncover the end of said spout. A connecting rod $l^2$ is pivoted at $m$ at one of its ends to one of the arms $l$ and at its other end to the crank pin $e^3$ with which the connecting rod $k^4$ is pivotally connected. The connecting rod $k^4$ being, as it is, connected with the arm $k^3$ on the opposite side of the axis of oscillation of the valve K from said valve, and the connecting rod $l^2$ being, as it is, connected with an arm $l$ on the same side of the axis of oscillation as is the valve L, and both connecting rods $k^4$ and $l^2$ being operated by the same crank pin, the valve K will be swung in a direction to cover the orifice $b^2$, while the valve L is swung to uncover the discharge opening of the spout $a^4$ and vice versa. This arrangement of the plate E and its crank pin $e^3$, the connecting rod $l^2$ pivoted to the arm $l$ between the valve L and its axis of oscillation, and connecting rod $k^4$ pivoted to an arm beyond the axis of oscillation of the valve K, is such that said connecting rods are brought into most effective positions, and further into such combinations with said valves and with the plate E and its crank pin $e^3$ that both valves are swung outwardly from the elevator to uncover the openings or orifices which orifices they close when swung in an opposite direction, and the location of the connecting rods $k^4$, and $l^2$, is such, together with the fact of the valve K swinging outwardly from the elevator trunk, that these parts are out of the way so as not to interfere with the falling movements of the hopper B, with a conveyer hopper below said hopper B.

A pivot bolt $m$ fixed to one of the bars $l$ passes through a slot $m'$ in the connecting rod $l^2$ to form the pivotal connection between said parts. A tension spring $m^2$ is connected at one end to the spout $a^4$ and at its other end to one of the bars $l$ in such manner that it tends to draw the valve L toward its closed position.

In further describing the complete operations of the weigher, we will assume that the operative parts in their operations have assumed the relative positions shown at Fig. 1, with the end $g^7$ of the tripping pawl G resting on the roller $h$ in the end $h'$ of the bell crank detent lever H, and thus holding the plate E, rods, $l^2$, $k^4$, and the valves K and L in the positions shown. The grain hopper B being at the same time held in its higher position by the scale beam with the weight $c^3$ adjusted thereon to balance the quantity of grain to be weighed or measured. Grain flowing from the now open spout $a^4$ into the hopper B until the weight thereof overbalances the weight $c^3$, will force the hopper downward to its lower position, shown at Fig. 2. In descending, as last described, the hopper will tilt or turn the bell crank detent lever H into the position shown by full lines at Fig. 2, and dot lines at Fig. 1, and thereby release the tripping pawl lever G, which will then be thrown by the spring $g$ into engagement with the ratchet wheel D, so as to be carried around in its orbit with the plate E and pinion $a^9$. In passing through that part of its orbit between its position shown at Fig. 1, and its position shown at Fig. 2, the crank pin $e^3$ by means of the connecting rod $k^4$ will swing the valve K from its closed position shown at Fig. 1 into its open position shown at Fig. 2, so that the charge of grain contained in the hopper B will be discharged into the hopper N of the conveyer spout P. The same movement of the crank pin which closes the valve K as last described, will retract or draw back the connecting rod $l^2$, and as it is so retracted the spring $m^2$ will close the valve L quickly and by the time that the valve K is about one half opened. The further retractile movement of the connecting rod $l^2$ is permitted without movement of the valve L by the slot $m'$ sliding on the pivot pin $m$ to the position shown at Fig. 2. The discharge of grain from the spout $a^4$ is thus cut off quickly and before the valve K has opened but slightly, so that practically no grain is delivered to the hopper B while grain is being discharged from the hopper. The hopper having discharged its contents will be raised into its higher position by the weight $c^3$, and in so raising will tilt the bell crank H back into its position shown by full lines at Fig. 1, where it will be struck by the end $g^7$ of the tripping pawl and will arrest its revolution as hereinbefore described; but before the revolution of the tripping pawl is thus arrested, the crank pin in moving through its orbital path from its position shown at Fig. 2, to its position, where arrested, and as shown at Fig. 1, will by means of the connecting rod $k^4$ swing the valve K into its closed position, as shown at said figure. The crank pin will at the same time move the connecting rod $l^2$, but such movement thereof will not act on the valve L until the valve K is about closed, and hence will not permit the discharge of grain into the hopper B while it is open at its lower end. This non-action of the connecting rod $l^2$ on the valve L arises from the slot $m'$ sliding on the pin $m$, during the first part of the movement of the rod $l^2$, but before such movement is completed the end of the slot $m'$ will come in contact with said pin and the valve L will be swung outwardly to its open position shown at Fig. 1, by the completion of the throw of said connecting rod.

The arm $h'$ of the bell crank detent, standing as it does, in a vertical position, while the end $g^7$ of the tripping pawl rests upon it, any force or pressure of the tripping pawl thereon will act on the pivot $h^3$, and not tend, as in ordinary devices of the kind, to act irregularly on the hopper, and thus interfere with accurate weighing, and such detent will swing easily, and especially when provided with the antifriction roller, will together with the tripping pawl form a very sensitive trip, which will yield readily and quickly and thus aid in accurate weighing of the grain.

The conveyer spout P is of ordinary construction having an endless conveyer belt $p$, grain receiving hopper N, and discharge opening $p'$. The stand Q or fixed part of the conveyer, consists of a base R, supported by bars $r$ or by any other frame work mounted on the elevator or any suitable part of a grain separator to which the elevator is fixed for operation. A shaft S journaled to pendants $s$ from the base R, is provided with a pulley $s'$ which is geared with any suitable drive pulley (not shown) on the elevator, so as to be operated by and at all times with the grain elevating mechanism of the elevator. A bevel pinion T is mounted on the shaft S, and gears with a bevel pinion $t$ which is carried on a vertical shaft $t'$ which carries a pinion $t^2$ on its upper end, and which has suitable bearings in the base R and in a plate U which is located above said base. The plate U can be rotated on the shaft $t'$ in a horizontal plane, and has vertical standards W, fixed to its diametrically opposite sides. The adjustable and readily removable part of the conveyer, consists of the spout P, with its hopper N, and conveyer belt, $p$, and a shaft Y, which is journaled in slots $w$ in the upper ends of the standards W, and has fixed to one of its outer ends a pinion $y$ which gears with the bevel pinion $t$. The shaft Y extends through the spout P and carries the sprocket wheel $p^2$ on which the belt $p$ is carried at one end of the conveyer spout. The spout P has a bar $p^3$ fixed to one of its sides which bar is provided with a bearing for the outer end of the shaft Y.

The spout P can be swung around to deliver grain in different directions from the elevator, by swinging it with its base plate U on the shaft $t'$, and in all of such adjustments the pinion $y$ will remain in gear with, to be operated by the pinion $t^2$. The spout P can also be raised and lowered at its discharge end to deliver grain at different elevations as may be desired, by swinging it on or with the shaft Y in its bearings, as indicated by dot lines at Fig. 1.

The hopper B, intermediary or interlocated between the discharge spout of the elevator and the hopper N, is immediately over the hopper N of the conveyer spout P in all adjustments of said spout, so that grain will be delivered to the hopper N when the spout P is in any position of its various adjustments.

As shown, the weigher and delivery spout P are mounted on an elevator of that class which stands in a vertical position, and in which the weigher necessarily is closer to the elevator trunk than when used on an inclined trunk, and hence valve operating mechanism which is in or about in the same plane as the lower end of the hopper B cannot be used with the vertical elevator trunk.

Having thus described our invention, what we claim as new is—

1. In a grain weigher, the combination substantially as hereinbefore described, with an elevator, a hopper suspended on a poised scale beam, a valve for the discharge spout of the elevator, and a valve for the bottom of the hopper, of a plate, means for intermittingly revolving said plate by intergear with a rotary shaft operated by the elevator, connecting rods both pivotally connected at one end to a crank pin on said plate, one of said rods slotted at its other end where it receives a pivot pin on the carrying arm of the spout valve between said valve and its axis of oscillation, and the other rod pivotally connected at its other end to the outer end of an arm which extends from the hopper valve to and beyond its axis of oscillation, whereby said valves are both operated by said intermittingly revolving plate.

2. In a grain weigher, the combination substantially as hereinbefore described, with an elevator, a hopper suspended on a poised scale beam, a valve for the discharge spout of the elevator, a retracting spring, and a valve for the bottom of the hopper, of a plate, means for intermittingly revolving said plate, by intergear with a rotary shaft operated by the elevator, connecting rods both pivotally connected at one end to a crank pin on said plate, one of said rods slotted at its other end where it receives a pivot pin on the carrying arm of the spout valve between said valve and its axis of oscillation, and the other rod pivotally conneced at its other end to the outer end of an arm which extends from the hopper valve to and beyond its axis of oscillation, whereby said valves are both operated by said intermittingly revolving plate.

3. In a grain weigher, and in combination substantially as hereinbefore described, with an elevator, and a hopper suspended on a poised scale beam, a valve for the discharge spout of the elevator, and a valve for the bottom of the hopper, a plate E carrying a crank pin $E^3$, rods pivotally connecting said crank pin with said valves, the valve retracting spring $m^2$, the spring actuated tripping pawl lever, and ratchet wheel D, and the bell crank detent H arranged with its arm $h'$ in a vertical position.

4. In a grain weigher, and in combination substantially as hereinbefore described, with an elevator, and a hopper suspended on a poised scale beam, a valve for the discharge spout of the elevator, and a valve for the bottom of the hopper, a plate E carrying a crank pin $e^3$, rods pivotally connecting said crank pin with said valves, the valve retracting spring $m^2$, the spring actuated tripping pawl lever and ratchet wheel D, and the bell crank detent H, arranged with its arm $h'$ in a vertical position and provided with an anti-friction roller for the purpose specified.

5. In a grain weigher, in combination with an elevator and a hopper suspended on a poised scale beam, valve K, arm $k^3$, rockshaft $k$, valve L, arm $l$, spring $m^2$, connecting rod $l^2$, having a slot $m'$ pivoted on pin $m$, bell crank detent H, spring actuated tripping pawl G, plate E with crank pin $e^3$, ratchet wheel D, and pinion $a^9$ all arranged to operate substantially as described.

6. In a grain weigher, and in combination substantially as hereinbefore described, with an elevator and a hopper suspended on a poised scale beam, a swinging valve K, arm $k^3$, connecting rod $k^4$ pivotally connected with arm $k^3$, swinging valve L, spring $m^2$, connecting rod $l^2$ having a slot $m'$, pivotally connected through said slot and pin $m$ with the valve arm $l$, and an intermittingly revolving plate E with a crank pin with which the connecting rods $l^2$, and $k^4$ are pivotally connected, substantially as described.

7. A grain conveyer, comprising in its structure a fixed base part comprising a base R, shaft S, pendants $s$, pulley $s'$, bevel pinions T, $t$, shaft $t'$, pinion $t^2$, plate U having vertical and diametrically opposite standards W mounted thereon; and a removable and adjustable part comprising a spout P, hopper N, conveyer belt $p$, shaft Y, and pinion $y$, in combination with an elevator and a weighing hopper on the elevator in proximity to and directly above the hopper N substantially as described and for the purpose specified.

In testimony whereof we affix our signatures in presence of two witnesses.

VALENTIN WEBER.
JAMES R. HARRISON.

Witnesses:
CHAS. HULTGREN,
H. M. RICHARDS.